Oct. 9, 1951   M. W. STIRLEN   2,570,404
MOTHER-OF-PEARL FISHING LURE
Filed May 16, 1949

Inventor

Morley W. Stirlen

By Clarence A. O'Brien
and Harvey B. Jacobson
Attorneys

Patented Oct. 9, 1951

2,570,404

UNITED STATES PATENT OFFICE 2,570,404

MOTHER-OF-PEARL FISHING LURE

Morley W. Stirlen, Muscatine, Iowa, assignor of one-third to Charles C. Hagermann and one-third to Fred W. Hermann, both of Muscatine, Iowa Application May 16, 1949, Serial No. 93,575

1 Claim. (Cl. 43—42.32)

This invention relates to a fishing lure of novel construction having a lure body fabricated of mother of pearl the primary object of which is to provide a strong, sturdy and attractive fishing lure which will be unusually effective in catching fish.

Another object of this invention is to provide a lure of the character described including a highly polished wire serving as an anchoring means for retaining a swivel and a gang of hooks on both ends of the mother of pearl lure body, the polished wire being formed with inturned loop portions which are yieldingly retained on the lure body.

A further object of this invention is to provide a lure of the character described in which recesses or apertures are provided adjacent the ends of the lure body for yieldingly and frictionally retaining the free ends of the loops of the anchor wire, the loops also serving as retaining means for a swivel at one end of the wire and a gang of hooks at the other end.

And yet another object of this invention is to provide an extremely attractive fish lure of the character described which is relatively simple in design and construction, easy to assemble for use, cheap to manufacture in large quantities, and extremely efficient for its intended purpose.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification similar reference characters indicate corresponding elements throughout.

Indicated generally at 10 is an elongated lure body fabricated of mother of pearl. Although the lure body can take various sizes, shapes and dimensions, it is preferred that it be relatively flat and somewhat curved. Preferably, the ends of the body are rounded as at 12 and 14 and adjacent the ends are provided apertures 16 and 18. As will be readily understood from the description which follows hereinafter, instead of apertures extending entirely through the lure body, suitable recesses may be employed which extend only partially through the body and which can serve the same function as the apertures themselves.

Indicated at 20 is an elongated anchor member, preferably in the form of a highly polished metallic, resilient wire which is inturned at its free ends to form loops 22 and 24, the loops being provided with vertically extending free end portions 26 and 28.

Figure 1:
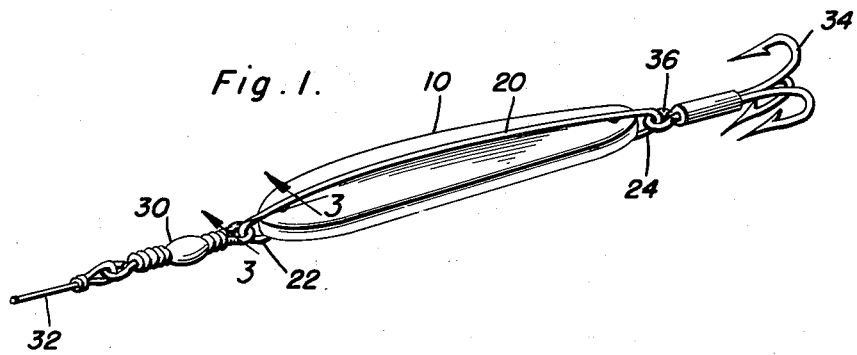
Figure 1 is a perspective view of the assembled fish lure.
Figure 2:
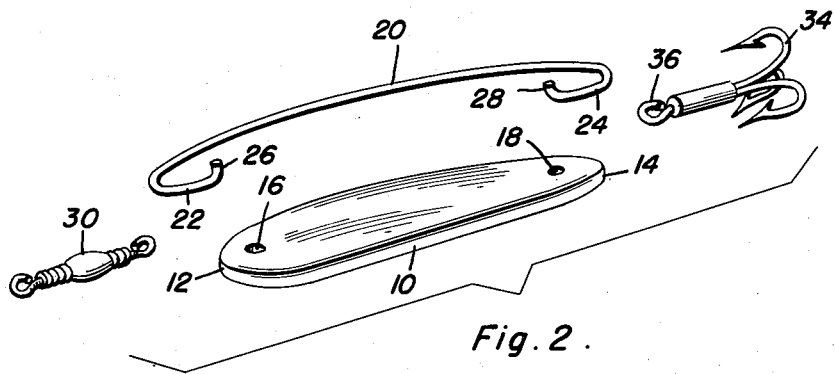
Figure 2 is a group assembly view in perspective of the various parts making up the fish lure.
Figure 3:
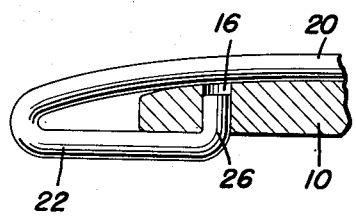
Figure 3 is a sectional view taken substantially on a plane of section line 3—3 of Figure 1.

In assembling the mother of pearl fishing lure, a conventional swivel 30 attached to a leader or line 32 is slipped onto one of the loops 22 and the anchor wire 20 is flexed so that the free end portion 26 slips into and is yieldingly retained in the aperture or recess 16 at one end of the lure body 10. Thereafter, a gang hook 34 having a loop 36 at one end is slipped over the other loop 24 and the anchor wire 20 is again flexed so that the free end portion 28 is slipped into and is yieldingly engaged in the aperture or recess 18 at the other end of the lure body. The total assembly of the lure body is shown clearly in Figure 1 and it will be seen that the apertures or recesses 16 and 18 are sufficiently close to the free ends 12 and 14 of the lure body 10 to form sufficient clearance therewith so that the swivel 30 and the gang hook 34 have some freedom of movement within the loops although they are securely retained upon the lure body. The combination of a highly polished anchor wire 20 and a mother of pearl lure body provides an extremely attractive and effective fishing lure, as will be readily understood by those skilled in the art.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fishing lure comprising an elongated flat mother of pearl body, said body being provided with an aperture therethrough proximate each end thereof, and a resilient polished metallic wire of length greater than the length of said body, said wire extending lengthwise across said body and including terminal loops loosely embracing the ends of said body, said loops being adapted to selectively receive a swivel and a fish hook, said loops further including inturned free end portions removably received in said apertures.

MORLEY W. STIRLEN.

REFERENCES CITED

The following references are of record in the file of this patent:

UNITED STATES PATENTS

| Number | Name | Date |
|---|---|---|
| 435,026 | Skinner | Aug. 26, 1890 |
| 1,232,167 | Arnold | July 3, 1917 |
| 2,124,152 | Salm | July 19, 1938 |
| 2,414,810 | Harris et al. | Jan. 28, 1947 |